(12) United States Patent
Noiri

(10) Patent No.: US 6,272,137 B1
(45) Date of Patent: Aug. 7, 2001

(54) ATM TRANSMISSION SYSTEM WITH SUBSYSTEMS INTERCONNECTED THROUGH REDUCED NUMBER OF SIGNAL LINES

(75) Inventor: Akira Noiri, Tokyo (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/045,646

(22) Filed: Mar. 20, 1998

(30) Foreign Application Priority Data

Mar. 21, 1997 (JP) .................................................. 9-067754

(51) Int. Cl.[7] .................................................. H04L 12/28
(52) U.S. Cl. .......................... 370/395; 370/419; 370/249
(58) Field of Search .................................. 370/369, 395, 370/396, 397, 250, 249, 522, 503; 770/400, 410, 419, 392, 393, 466, 467, 535, 471, 409

(56) References Cited

U.S. PATENT DOCUMENTS 5,528,590 * 6/1996 Iikida .................................. 370/395

6,031,838 * 2/2000 Okabe .................................. 370/395

* cited by examiner

Primary Examiner—Seema S. Rao
Assistant Examiner—Ricardo M. Pizarro
(74) Attorney, Agent, or Firm—Rabin & Champagne, P.C

(57) ABSTRACT

An ATM transmission system without having a dedicated line for transmitting maintenance information between subsystems constituting the ATM transmission system. The ATM transmission system introduces the idea of a multiframe for transmitting ATM cells, and transmits the maintenance information by inserting it into an overhead portion of the multiframe. This enables the number of lines interconnecting the subsystems to be reduced. The ATM transmission system includes in its interface circuit a set of parallel processors of the same configuration. The number of the parallel processors equals the least common multiple of ratios between the minimum interface rate and one or more other interface rates of other ATM transmission subsystems interconnected to the ATM transmission system. This enables the subsystems with different interface rates to become the interconnected ATM transmission system.

10 Claims, 10 Drawing Sheets

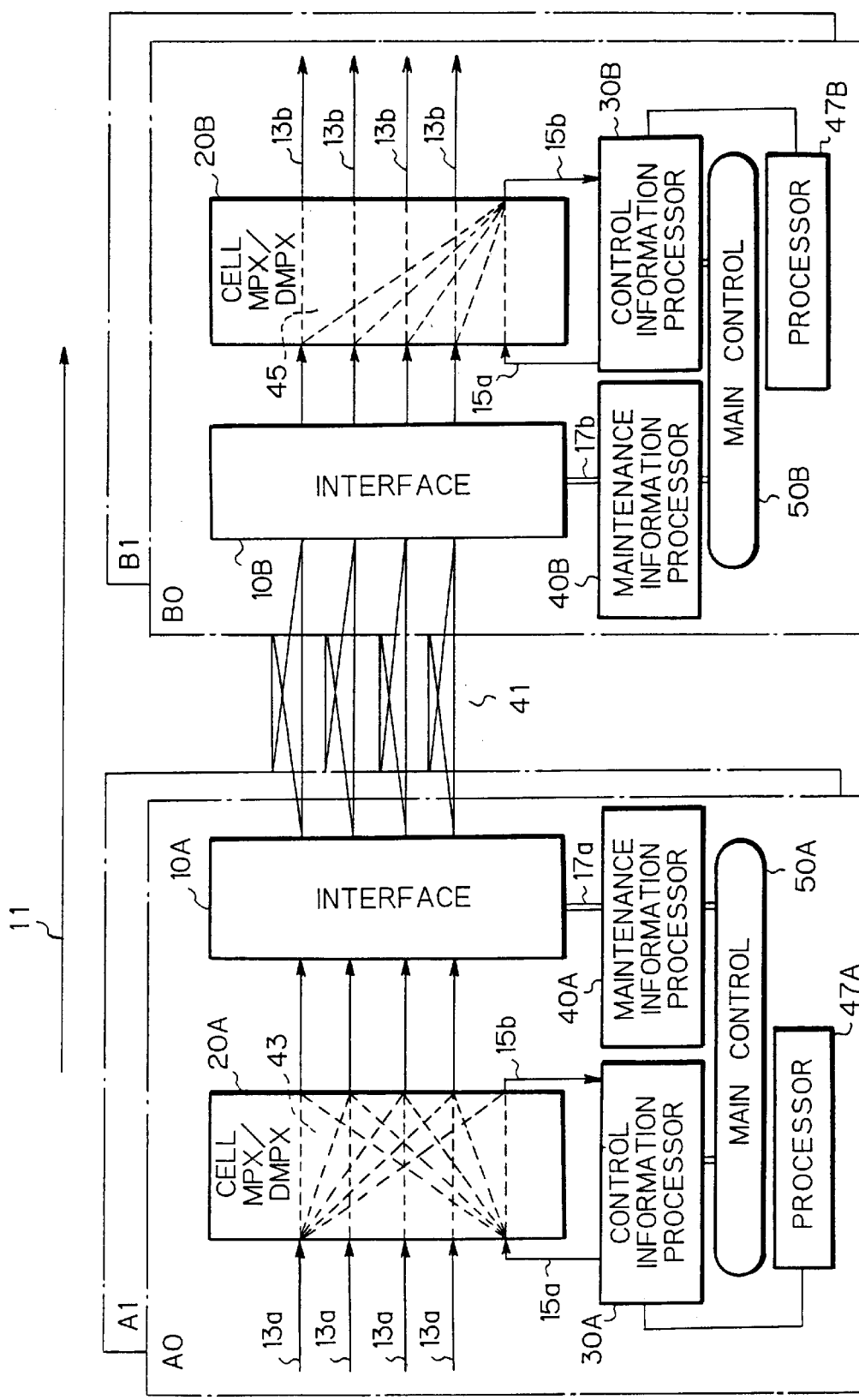

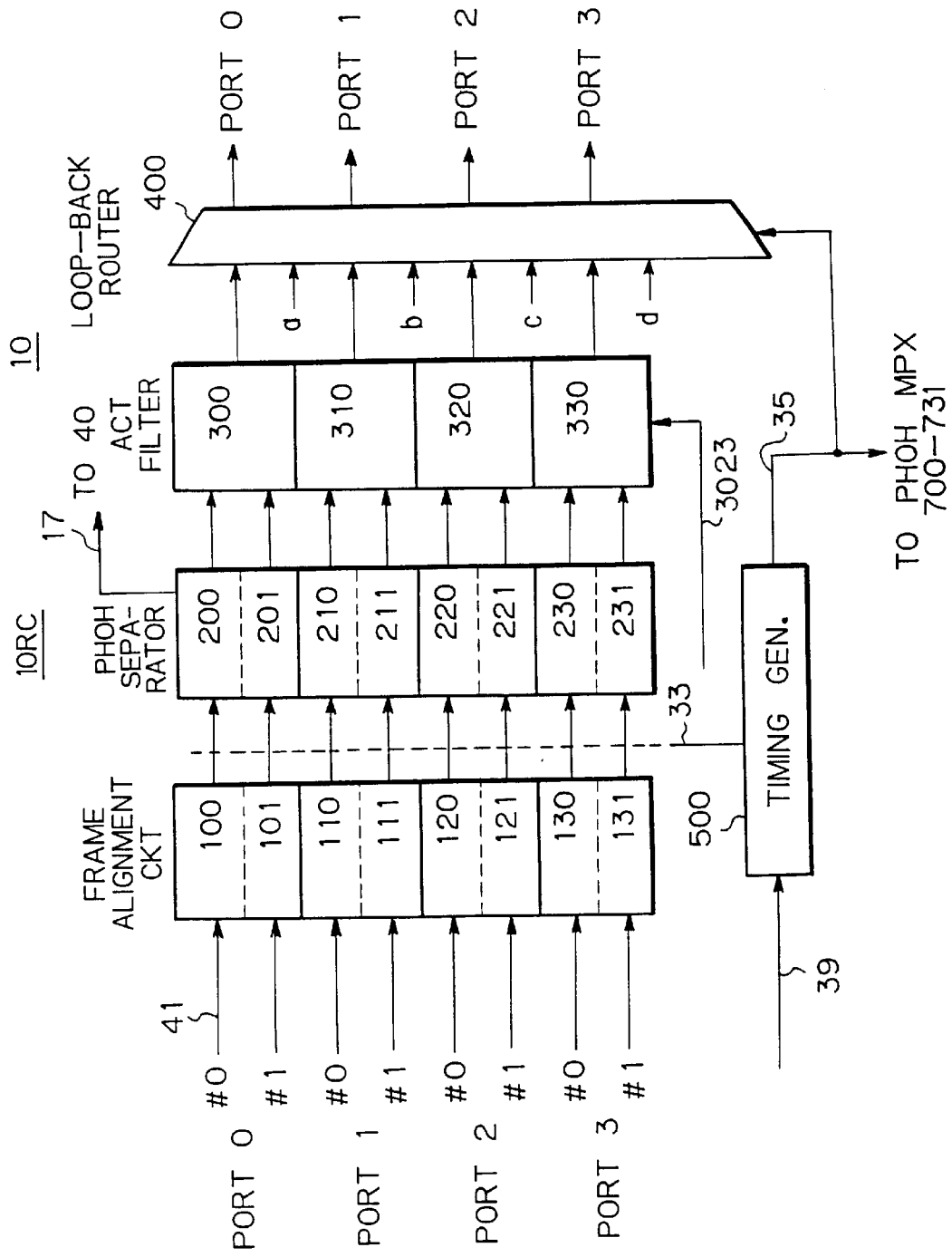

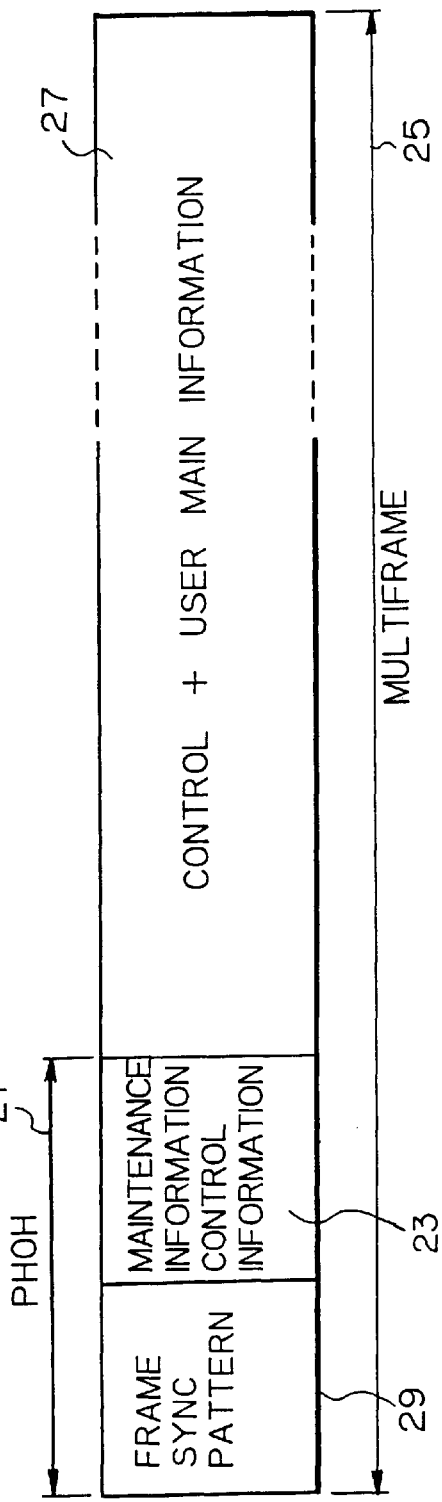

ATM TRANSMISSION SYSTEM WITH SUBSYSTEMS INTERCONNECTED THROUGH REDUCED NUMBER OF SIGNAL LINES

BACKGROUND OF THE INVENTION

1. Field of the Invention

The present invention relates to an ATM (Asynchronous Transfer Mode) transmission system, which is advantageously applied to interface portions of subsystems of an ATM switch system, for example.

2. Description of the Background Art

An ATM switch system is a considerably large system including not only an ATM switch having a CPU (Central Processing Unit), but also line termination units, channel equipment and trunk circuits. Generally, the ATM switch, line termination units, channel equipment and trunk circuits are each arranged in the form of an individual subsystem included in a separate casing. The ATM switch plays the role of a higher-order system, while the line termination units, channel equipment and trunk circuits constitute a lower-order system. The higher-order and lower-order systems are interconnected by an interface line, a maintenance information line and a timing signal line.

The interface line is provided for transferring, between the higher-order and lower-order systems, multiplexed main, or user, information and control information. More specifically, it employs the in-channel control method, in which the control information is transferred over the same transmission line as the user or main information. The maintenance information line transfers maintenance information between the higher-order and lower-order systems. The maintenance information includes a reset signal and an LED (Liquid Crystal Display) display signal sent from the higher- to lower-order system, and an interrupt signal sent from the lower- to higher-order system. A timing signal line is provided for transferring timing signals such as a clock signal and a sync signal from the higher- to lower-order system.

The higher-order system can be connected to various types of lower-order systems. For example, it can be connected to lower-order systems with different interface rates such as 622 Mbps and 155 Mbps (bit per second), for example. In the ATM switch system, in practice, the line termination unit is installed correspondingly as the lines increase, in which case the interface rates of the lower-order systems can be changed dependently upon the fact that the line termination unit is changed to a new type or one including a different capacity of lines.

The conventional ATM switch system involves the following problems. First, it is necessary to install not only the interface line for conveying the user main information and control information, but also the maintenance information line and timing line between the higher-order and lower-order systems. If both systems are located at a distance from each other, these lines are long as well. Thus, it is highly desirable that the lines other than the interface line be omitted. In practice, a lot of lines are installed between the higher-order and lower-order systems, and this presents problems of increasing connection failures and of requiring increasing area and space. The problems involved in installing the lines become more serious when applying a redundant system configuration such as a duplex system.

Second, another problem arises in that the configuration of an interface circuit between the higher-order and lower-order systems becomes complicated when the lower-order systems have different interface rates. For example, when one of the lower-order systems selects 155 Mbps as its interface rate, it is impossible to send to the one system the user main information at the interface rate of 622 Mbps. On the contrary, if it selects 622 Mbps as its interface rate, it is necessary to quadplex the 155 Mbps user main information, and dequadplex them at the receiving side.

Furthermore, although the conventional ATM switch system employs the in-channel method as mentioned above, the receiving side relinquishes the use of a processor for the user main information while receiving the maintenance information, thereby consuming time ineffectively.

SUMMARY OF THE INVENTION

It is therefore an object of the present invention to provide an ATM transmission system capable of obviating the dedicated line for conveying the maintenance information.

Another object of the present invention is to provide an ATM transmission system which can be interconnected to other ATM transmission systems corresponding thereto, independently of their interface rates.

Still another object of the present invention is to provide an ATM transmission system capable of making use of the period of time in which the maintenance information is received to carry out a loop-back test.

A further object of the present invention is to provide an ATM transmission system for use as a component system forming a redundant system, which can acquire ATM cells sent from systems constituting a redundant system corresponding thereto with the received ATM cells aligned in phase.

According to a first aspect of the present invention, there is provided an ATM transmission system comprising: a multiplexer for multiplexing ATM cells to be sent to the ATM transmission system interconnected thereto; a maintenance information processor for generating maintenance information to be sent to the interconnected ATM transmission system; and an interface circuit for establishing interface with an interconnected ATM transmission system, wherein the interface circuit includes a data transmitter for assembling and transmitting a multiframe including an information field and an overhead portion having a multiframe sync pattern, the multiframe being assembled by inserting into the information field the ATM cells multiplexed by the multiplexer and by inserting into the overhead portion the maintenance information fed from the maintenance information processor.

The interface circuit may advantageously further comprise: a data receiver for deassembling received data including the multiframe sent from the party ATM transmission -system into the ATM cells and the maintenance information, and for providing the maintenance information processor with the maintenance information; and a demultiplexer for demultiplexing the ATM cells output from the data receiver into individual ATM cells.

The ATM transmission system may further comprise a timing generator for generating timing signals used in the ATM transmission system in response to the multiframe sync pattern in the received data.

The ATM transmission system may also further comprise a loop-back test circuit for carrying out a loop-back test of its own ATM transmission system while the overhead portion of the multiframe is being processed.

The data transmitter and the data receiver may each comprise parallel processors whose number equals a least common multiple of one or more ratios between a minimum interface rate and one or more other interface rates of the one or more interconnected ATM transmission systems, and the ATM transmission system may comprise an ATM cell transfer and acquisition circuit for providing, at the minimum interface rate, each of the parallel processors of the data transmitter with an ATM cell to be transmitted, and for acquiring, from each of the parallel processors of the data receiver, a received ATM cell sent at the minimum interface rate.

According to a second aspect of the present invention, there is provided an ATM transmission system comprising an interface circuit including a data transmitter for transmitting an ATM cell to one or more ATM transmission systems interconnected thereto, and a data receiver for receiving an ATM cell sent from the interconnected ATM transmission system, wherein the data transmitter and the data receiver each include parallel processors whose number equals a least common multiple of one or more ratios between a minimum interface rate and one or more other interface rates of the one or more interconnected ATM transmission systems; and wherein the ATM transmission system comprises an ATM cell transfer and acquisition circuit for providing, at the minimum interface rate, each of the parallel processors of the data transmitter with an ATM cell to be transmitted, and for acquiring, from each of the parallel processors of the data receiver, a received ATM cell sent at the minimum interface rate.

According to a third aspect of the present invention, there is provided an ATM transmission system which is operative as any one of an active and a standby system forming a redundant system, and comprises an interface circuit including a data transmitter and a data receiver, wherein the data transmitter transmits to an associated one of the interconnected ATM transmission systems an externally supplied ATM cell in the form of a multiframe which has a period of an integer multiple of a period of the ATM cell, and includes an information field for carrying the ATM cell and an overhead portion for containing at least a multiframe sync pattern, the data receiver receiving, from each of the interconnected ATM transmission systems, received data in a form of the multiframe while carrying out frame alignment in response to the multiframe sync pattern inserted in the multiframe, and extracting an ATM cell from the multiframe of the received data.

According to a fourth aspect of the present invention, there is provided an ATM transmission system which is operative as any one of an active and a standby system forming a redundant system for transferring an ATM cell to a plurality of interconnected ATM transmission systems forming a party redundant system, and which comprises: an effective-information bit handling circuit for setting an effective-information bit in an ATM cell to be transmitted to one of effective and ineffective states in response to a type of the ATM cell and to whether the ATM transmission system is an active or standby system; and a received ATM cell passage control circuit for discarding an ATM cell from each of an active system and a standby system of the interconnected redundant system when the effective-information bit of the ATM cell indicates the ineffective state, and for outputting incoming ATM cells from the active system and the standby system with their output timings shifted when the effective-information bits of the incoming ATM cells indicate the effective state.

The received ATM cell passage control circuit may advantageously pass, when system fixing information is externally provided to the ATM transmission system, only an effective ATM cell sent from the ATM transmission system of the interconnected redundant system, which corresponds to the ATM transmission system indicated by the system fixing information.

BRIEF DESCRIPTION OF THE DRAWINGS

The objects and features of the present invention will become more apparent from consideration of the following detailed description taken in conjunction with the accompanying drawings in which:

FIG. 1 is a schematic block diagram showing interconnections between subsystems of a preferred embodiment of an ATM switch system in accordance with the present invention;

FIG. 2A is a schematic block diagram showing a specific configuration of the receiver of an interface circuit of the embodiment;

FIG. 3 shows a logic table showing the rewrite logic of the ACT rewrite circuit shown in FIG. 2B;

FIG. 4 is a schematic diagram illustrating a whole structure of a multiframe employed by the embodiment;

DESCRIPTION OF THE PREFERRED EMBODIMENTS

Figure 2B:
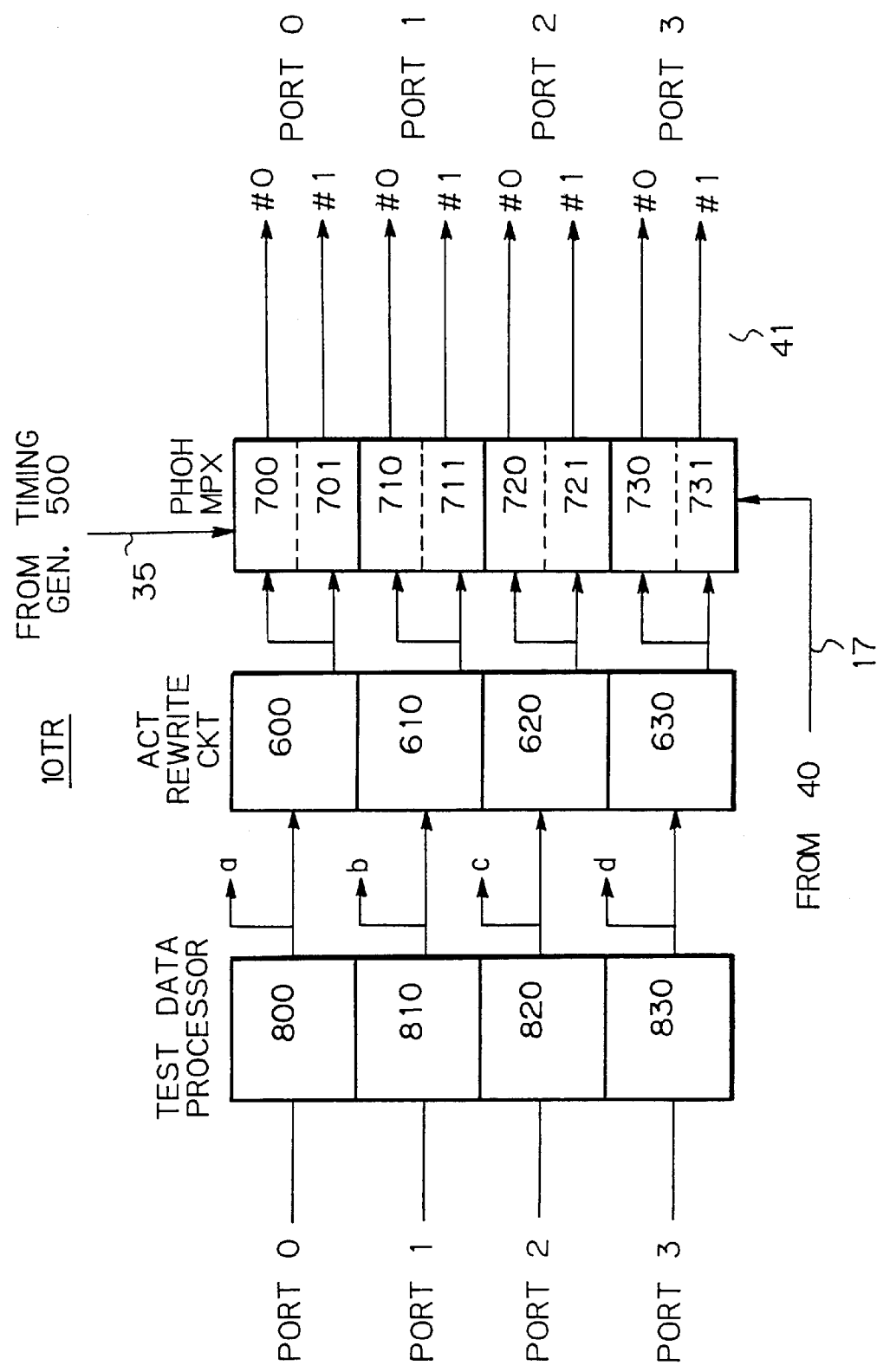
FIG. 2B is also a schematic block diagram showing a specific configuration of the transmitter of the interface circuit of the embodiment.

Referring to FIG. 1, schematically showing in a block diagram form a preferred embodiment of an ATM transmission system in accordance with the present invention, the ATM transmission system has redundancy including two sets of subsystems, a couple of higher-order subsystems A0 and A1 and a couple of lower-order subsystems B0 and B1. Their interface rate matches and the information is exemplarily shown in the figure to flow in one direction depicted by an arrow 11 from subsystems A to B, though it may flow in opposite directions in practice.

In FIG. 1, each of the subsystems A0 and A1 comprises an interface circuit 10A, cell multiplexer/demultiplexer (MPX/DMPX) 20A, control information processor circuit 30A, maintenance information processor circuit 40A and main control 50A, which are interconnected as specifically shown with the subsystem A0. The subsystem A1 has the same sturcture as the subsystem A0. Likewise, each of the subsystems B0 and B1 comprises an interface circuit 10B, cell multiplexer/demultiplexer 20B, control information processor circuit 30B, maintenance information processor circuit 40B and main control 50B, which are interconnected as also specifically shown with the subsystem B0. The subsystem B1 is the same in sturcture as the subsystem B0. The subsystems A0 and A1 are cross-connected as shown by interconnections 41 to the subsystems B0 and B1.

The cell multiplexer/demultiplexers 20A and 20B of the subsystems A and B, respectively, are each adapted to multiplex user, or main, information 13a and control information, both provided in the form of a cell, and demultiplex received information into user, or main, information 13b and control information in the form of cells, as depicted with dottedlines 43 and 45, respectively. In the specification, information is designated by a reference numeral designating a connection on which the information appears. Since FIG. 1 specifically shows the case in which the information flows from the subsystems A to B in the direction 11, the cell multiplexer/demultiplexer 20A is in the condition to carry out multiplexing while the cell multiplexer/demultiplexer 20B is in the condition to carry out demultiplexing in this figure.

The control information processor circuits 30A and 30B are each adapted to provide cell multiplexer/demultiplexers 20A and 20B with the control information 15a under the control of the main controls 50A and 50B, and process the control information 15b separated by the cell multiplexer/demultiplexers 20A and 20B, respectively. Since FIG. 1 shows the case in which the information flows from the subsystems A to B, the control information processor circuit 30A is depicted to send the control information 15a toward the system B while the control information processor circuit 30B is depicted to accept the demultiplexed control information 15b in this figure.

The maintenance information processor circuits 40A and 40B are each adapted to provide, under the control of the main controls 50A and 50B, respectively, the interface circuits 10A and 10B with maintenance information 17a and accept the maintenance information 17b received by the interface circuits 10A and 10B to process it, respectively. Of course, the maintenance information processor circuit 40A is also adapted to accept the maintenance information 17a received by the interface circuit 10A to process it, and maintenance information processor circuit 40B is to provide the interface circuit 10B with maintenance information 17b.

The main controls 50A and 50B of the subsystems A and B, respectively, are adapted to control over the associated subsystems A and B and information transfer between them.

The interface circuits 10A and 10B of the subsystems A and B are adapted to establish interface (information transfer) with the interconected interface circuits 10B and 10A of the subsystems B and A constituting the redundancy system, respectively. The interface circuit 10A and 10B are chiefly adapted to handle transfer of the control information and user main information. In addition, they also serve to transfer and receive the maintenance information to and from the maintenance information processor circuits 40A and 40B, respectively, and timing information to and from the subsystems B and A, respectively, in this embodiment, as will be described later. Since FIG. 1 shows the information flow from the subsystems A to B in the direction 11, the interface circuit 10A is depicted in the condition to carry out the transmission processing while the interface circuit 10B is to carry out the receiving processing in this figure.

Referring to FIGS. 2A and 2B, showing one of the interface circuits 10A and 10B shown in FIG. 1, the interface circuit, generally designated by a reference numeral 10, specifically comprises a data transmitter 10TR, a data receiver 10RC, and a timing generator 500 shared by both of them. In the illustrative embodiment, the data transmitter 10TR, FIG. 2B, comprises test data processor circuits 800, 810, 820 and 830, ACT (operative state information) rewrite or update circuits 600, 610, 620 and 630, and PHOH (physical overhead information) multiplexers 700, 701, 710, 711, 720, 721, 730 and 731. The data receiver 10RC, FIG. 2A, comprises frame alignment circuits 100, 101, 110, 111, 120, 121, 130 and 131, PHOH separator circuits 200, 201, 210, 211, 220, 221, 230 and 231, ACT filters 300, 310, 320 and 330, and a loop-back router 400.

More specifically, the test data processor circuits 800, 810, 820 and 830 are each adapted to receive ATM cells by the associated input ports #0, #1, #2 and #3 of the transmitter 10TR of the mating interface circuit 10 interconnected thereto by the connections 41. The ATM cell to be received is either a user main information ATM cell or a control information ATM cell as described above.

In particular, the test data processor circuits 800, 810, 820 and 830 of the instant embodiment are each provided, besides the ATM cells, also with test data through the input ports #0, #1, #2 and #3 during a loop test, in which the maintenance information and multiframe sync pattern are transferred as will be described later.

The test data processor circuits 800, 810, 820 and 830 are also adapted to provide the loop-back router 400 with the test data fed from the port #0, #1, #2 and #3 on signal lines, not specifically shown in this figure just for simplicity, when the timing generator 500 outputs a signal indicating the test period, and provide the ACT rewrite circuits 600, 610, 620 and 630 with ATM cells delivered from the ports #0, #1, #2 and #3 in other time periods.

The ACT rewrite circuits 600, 610, 620 and 630 are each adapted to update effective-information bits of the ATM cells in response to the operative system state in which they each are involved or to the type of the ATM cells, and supply those bits to the associated PHOH multiplexers 700 and 701, 710 and 711, 720 and 721, and 730 and 731, respectively. Here, the effective-information bits are placed at the state indicating that the ATM cells are valid when input.

More specifically, as shown in FIG. 3, the ACT rewrite circuits 600, 610, 620 and 630 update the effective-information bits to invalid, or false, binary values only when the subsystem in which the interface circuit 10 is involved is in its standby condition, and the input ATM cell is the user main information cell. They do not update them in the remaining cases so that the effective-information bits remain indicating that the input ATM cells are valid.

Since the control information has to be transmitted even from the subsystem of the standby system to the interconnected, mating subsystem, the effective-information bits of an ATM cell including the control information, are made valid regardless of the active or standby condition. It is possible to identify the type of the ATM cells as to whether they are a control information cell or a user main information cell because the ATM cells in accordance with the in-channel control scheme include their identifier, so that the ACT rewrite circuits 600, 610, 620 and 630 use it for their identification.

The PHOH multiplexers 700, 701, 710, 711, 720, 721, 730 and 731 are each adapted to multiplex the PHOHs when the timing signal from the timing generator 500 indicates the PHOH period 21 as shown in FIG. 4, and outputs them. The PHOH period 21 includes a period 23 into which the maintenance information of the system is to be inserted as shown in FIG. 4, so that the PHOH multiplexers 700, 701, 710, 711, 720, 721, 730 and 731 each insert the maintenance information 17a and 17b delivered from the maintenance information processor circuits 40A and 40B, respectively, to the maintenance information period or field 23.

Figure 5:
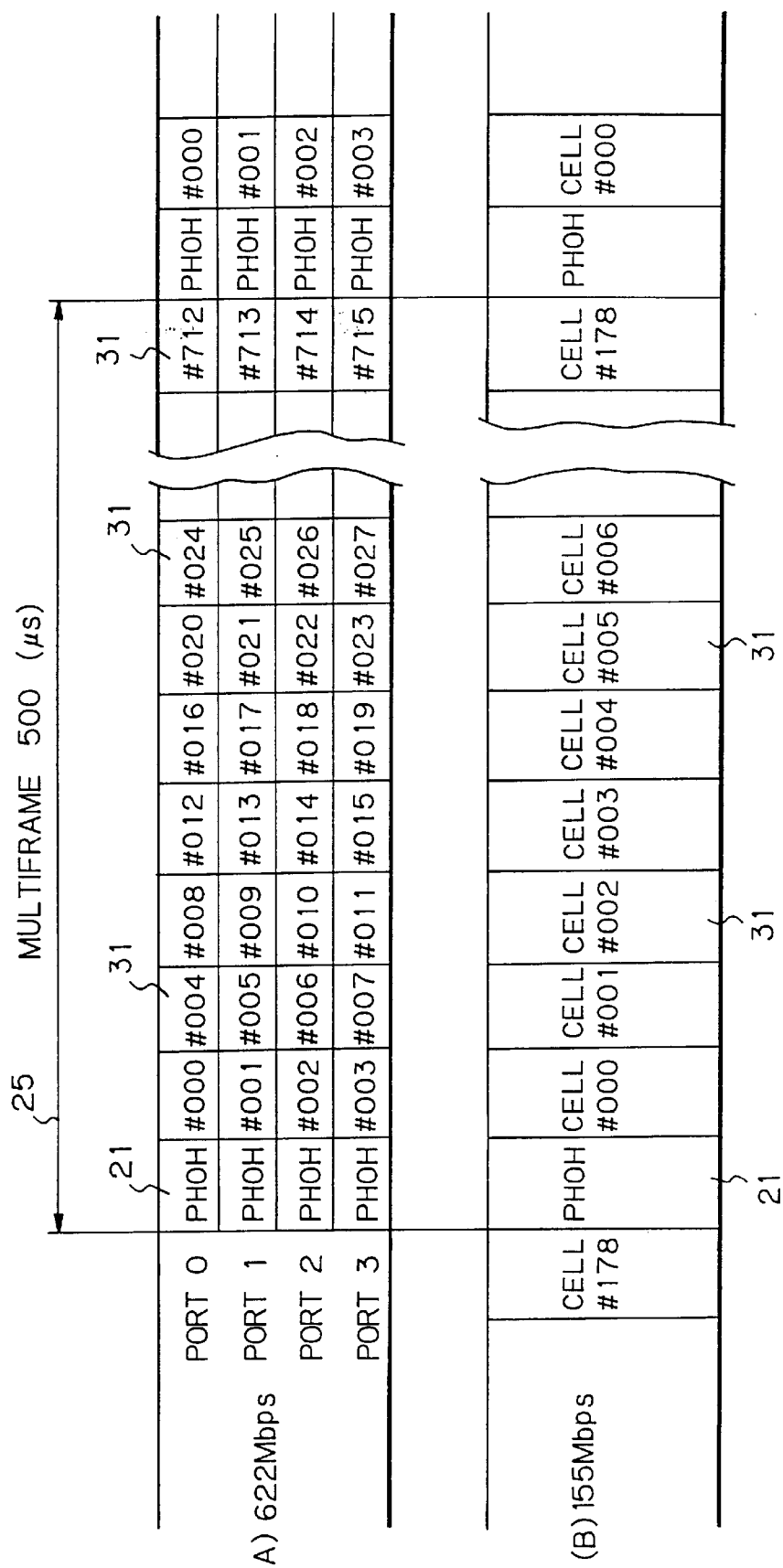
FIG. 5 is a schematic diagram illustrating a specific structure of the multiframe shown in FIG. 4 in parts (A) and (B) when the interface rate is 622 Mbps and 155 Mbps, respectively.

Reference is made to FIGS. 4 and 5 showing the outline of the multiframe structure 25 employed by the instant embodiment, and its specific details. The multiframe 25 is generally divided into the PHOH period 21 and the control information/user main information period 27. The PHOH period 21 is subdivided into a frame sync pattern period 29 into which a frame sync pattern is inserted, and an intra-system maintenance information period 23 into which intra-system maintenance information is inserted.

One multiframe period 25 continues 500 microseconds as shown in FIG. 5, for example, and its $\frac{1}{180}$ fraction is assigned to the PHOH period 21. When the interface rate is 155 Mbps, one multiframe period 25 consists of 180 cell periods, with one cell period assigned to the PHOH period 21, and the remaining 179 periods 31 reserved for the ATM cells to be inserted as shown in part (B) of FIG. 5. On the other hand, when the interface rate is 622 Mbps, one multiframe period 25 consists of 720 cell periods, with four cell periods assigned to the PHOH period 21, and the remaining 716 periods 31 reserved for the ATM cells to be inserted as shown in part (A) of FIG. 5.

When each of the subsystems A0 and A1 is connected to one of the subsystems B0 and B1 at an interface rate of 622 Mbps as shown in FIG. 1, the PHOH multiplexers 700 and 701 of the subsystems A0 and A1 send to the subsystems B0 and B1 the data sequence in accordance with the format of the port #0 shown in part (A) of FIG. 5, the PHOH multiplexers 710 and 711 of the subsystems A0 and A1 send to the subsystems B0 and B1 the data sequence in accordance with the format of the port #1 shown in part (A) of FIG. 5, the PHOH multiplexers 720 and 721 of the subsystems A0 and A1 send to the subsystems B0 and B1 the data sequence in accordance with the format of the port #2 shown in part (A) of FIG. 5, and the PHOH multiplexers 730 and 731 of the subsystems A0 and A1 send to the subsystems B0 and B1 the data sequence in accordance with the format of the port #3 as shown in part (A) of FIG. 5.

By the time the ATM cells are input to the interface circuit 10, they have already been divided into cell streams for the individual ports to each of the subsystems B0 and B1. In this case, the maintenance information to be inserted to the respective port data is the same because it is sent to the same subsystems B0 and B1. Thus, the data transmitted from each port of the interface circuit 10 when the interface rate is 622 Mbps is the same as that transmitted at 155 Mbps as shown in part (B) of FIG. 5.

Next, the components of the data receiver 10RC of the interface circuit 10 will be described with reference to FIG. 2A. The frame alignment circuits 100, 101, 110, 111, 120, 121, 130 and 131 are adapted to cooperate with each other to align the phases of a plurality of input data fed on the transmission line with reference to the frame sync pattern. The frame alignment circuits 100, 101, 110, 111, 120, 121, 130 and 131 are adapted to be provided with the interface rate information so that they perform the frame alignment based on that information because the combination of data to be subjected to the phase adjustment depends upon the interface rate of the paired subsystems.

Figure 6B:
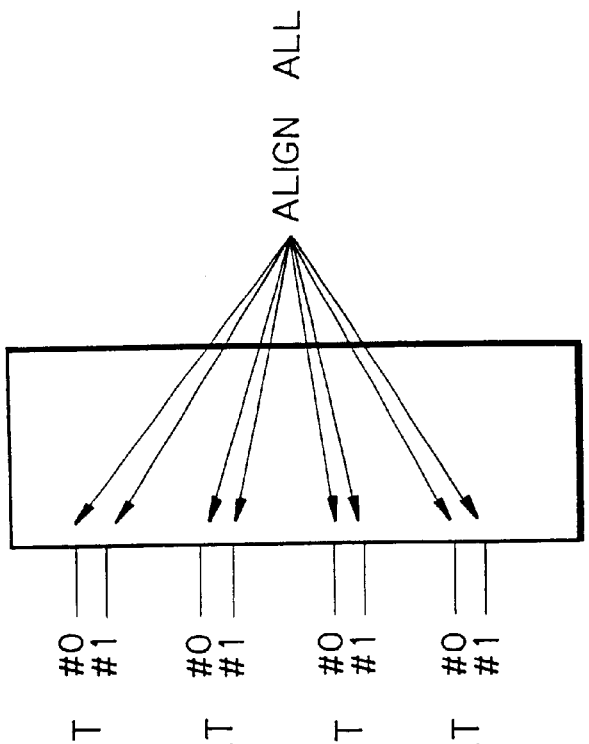
FIG. 6B is also a schematic diagram, similar to FIG. 6A, useful for understanding the operation of the frame alignment circuits of FIG. 2A when the interface rate is 622 Mbps.
Figure 6A:
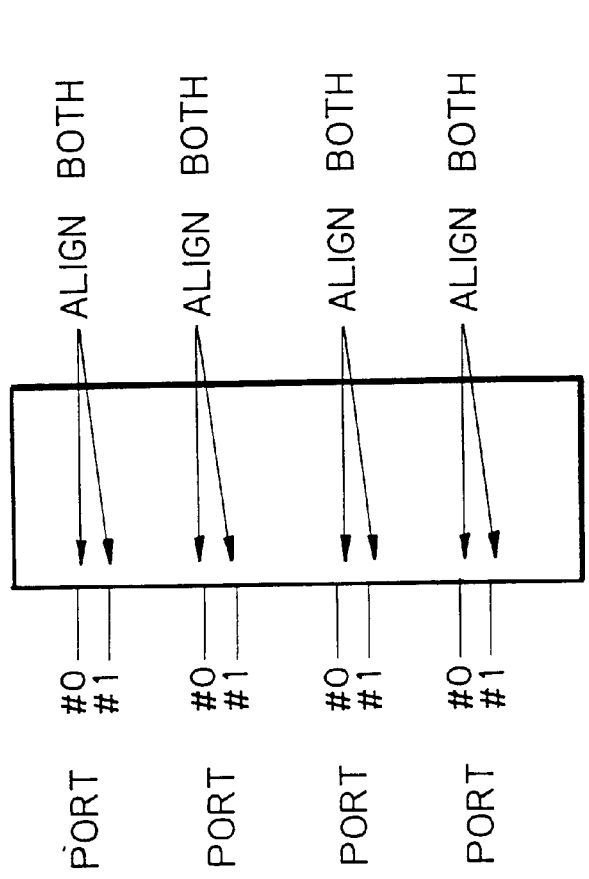
FIG. 6A is a schematic diagram useful for understanding the operation of the frame alignment circuits of FIG. 2A when the interface rate is 155 Mbps.

When the interface circuit 10 involved in a subsystem is interconnected to another interface circuit 10 of the subsystem interconnected thereto with an interface rate of 622 Mbps, the frame alignment (phase matching) is carried out among the entire frame alignment circuits 100, 101, 110, 111, 120, 121, 130 and 131 associated with all the input ports as shown in FIG. 6B. The frame alignment is performed by first establishing the frame sync in individual systems, followed by phase adjustments between the input ports of the individual system, and finally the phase adjustment between the two systems. In this case, the criteria of the sync establishment are as follows: (1) The frames are assumed to be out of sync until the frame sync patterns of the entire input ports of the two systems are found after power is turned on. (2) They are assumed to be out of sync while any of the input ports in the same system is in the backward guarding. (3) They are assumed to have established the sync after the backward guard time has elapsed of the entire input ports in the same system. (4) They are assumed to. be in sync during the forward guarding of any of the input ports of the same system. (5) They are assumed to be out of sync after the forward guard period of time has elapsed of any of the input ports in the same system.

The forward guarding and the backward guard periods of time may be defined at a desired value. For example, the forward guard period of time can be set at five steps and the backward guard period of time may be set at two steps.

Once the frame alignment has been established in both of the systems, the frame alignment circuits 100, 101, 110, 111, 120, 121, 130 and 131 do not carry out, regardless of the interface rate, the sync processing based on a new timing until both the systems lose the frame alignment. If both the systems lose the frame alignment, the frame alignment must be established again through the same procedure as when the power is turned on.

Here, the loss of frame alignment of both the systems refers to the state in which the systems A0 or B0 and A1 or B1 are out of sync at the same time regardless of the past history. For example, it is not considered as the loss of the frame alignment of both the systems when the system A0 or B0 lost sync in the frame alignment state of both systems, followed by its return to the frame alignment state, and by the loss of the frame alignment of the system A1 or B1.

Applying the foregoing criteria of the frame alignment can prevent malfunction due to a deviation of timing involved in disconnection or reconnection of a transmission line during the operation of the active subsystems.

The PHOH separator circuits 200, 201, 210, 211, 220, 221, 230 and 231 are each adapted to separate the maintenance information 17b, for example, which has been inserted in the received data fed from the associated frame alignment circuits 100, 101, 110, 111, 120, 121, 130 and 131, in response to the timing signal 33 generated from the timing generator 500, supply the information 17b, for example, to the maintenance information processor circuit 40A or 40B, FIG. 1, and also provide the associated ACT filters 300, 310, 320 and 330 with the received data from which the maintenance information 17b has been separated.

The maintenance information 17a, for example, is transferred between the subsystems in their active and standby condition using the functions of the PHOH multiplexers 700, 701, 710, 711, 720, 721, 730 and 731 and PHOH separator circuits 200, 201, 210, 211, 220, 221, 230 and 231. It is natural for the maintenance information to be handled as such because the maintenance information is used to control the system conditions.

The ACT filters 300, 310, 320 and 330 are each adapted to make a decision on whether or not the ATM cells delivered from the associated pairs of PHOH separator circuits 200 and 201, 210 and 211, 220 and 221, and 230 and 231 are effective from the effective-information bits in the ATM cells, and in turn supply the effective ATM cells to the loop-back router 400.

Figure 7:
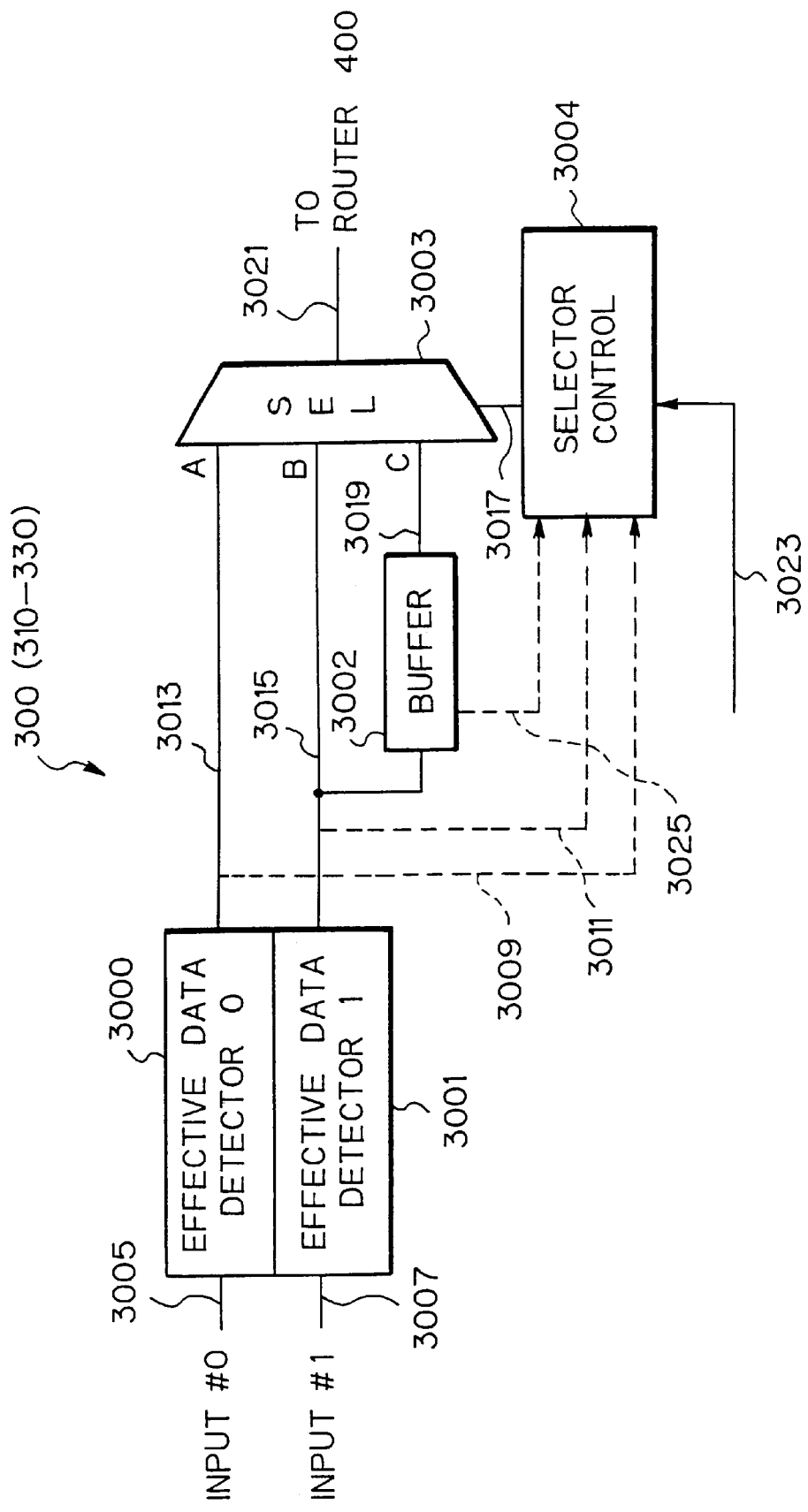
FIG. 7 is a schematic block diagram showing one of the ACT filters of FIG. 2A.

Referring now to FIG. 7, showing an exemplified configuration of the ACT filter 300 (310, 320 or 330), it comprises a system-0 effective data detector 3000, system-1 effective data detector 3001, buffer 3002, selector (SEL) 3003 and selector control circuit 3004, which are interconnected as shown in the figure. The system-0 and system-1 effective data detectors 3000 and 3001, are each adapted to make a decision on whether or not the ATM cell 3005 and 3007, respectively, input to their own systems is effective from the effective-information bits in the ATM cell, supply the decision result to the selector control circuit 3004 as depicted by dotted lines 3009 and 3011, and thereafter pass the ATM cell without change over lines 3013 and 3015, respectively.

The buffer 3002 comprises a FIFO (Frist-In First-Out) memory for buffering the ATM cells 3015 output from the system-1 effective data detector 3001, and, when storing any ATM cells, notifies the selector control circuit 3004 on a line 3025. The buffer 3002 receives a write command and a read command from the selector control circuit 3004, although the control line associated with them is not shown in this figure merely for the simplicity.

The selector 3003 is adapted to select, in response to a control signal 3017 supplied from the selector control circuit 3004, one of the ATM cells 3013 (A) and 3015 (B) supplied from the system-0 and system-1 effective data detectors 3000 and 3001 and the earliest ATM cell 3019 (C) stored in the buffer 3002, and supplies the loop-back router 400, FIG. 2A, with the selected one from its output 3021.

The selector control circuit 3004 may be adapted to be externally provided with selected system fixing command information 3023, and changes its selection control scheme for the selector 3003 depending on whether or not the selected system fixing command information 3023 is provided. Specifically, in response to the selected system fixing command information 3023 thus provided, the selector control circuit 3004 controls the selector 3003 such that it selects the ATM cell 3013 output from the system-0 or system-1 effective data detector 3000 or 3001 of that system designated by the information 3023. The selection by the selected system fixing command information 3023 is particularly effective when one of the redundancy systems is to be selected for undergoing maintenance check, or it falls into a failure.

The selector control circuit 3004 is adapted to control the selector 3003 in such a fashion as will be discussed below when no selected system fixing command information 3023 is provided.

(1) If the system-0 effective data detector 3000 detects an effective ATM cell, but the system-1 effective data detector 3001 does not, the selector control circuit 3004 has the selector 3003 select the ATM cell 3013 output from the system-0 effective data detector 3000.

(2) If both the system-0 and system-1 effective data detector 3000 and 3001 detect an effective ATM cell, the selector control circuit 3004 has the selector 3003 select the ATM cell 3013 output from the system-0 effective data detector 3000, and has the buffer 3002 store the ATM cell 3015 output from the system-1 effective data detector 3001.

(3) If the system-0 effective data detector 3000 does not detect an effective ATM cell, but the system effective data detector 3001 detects one, the selector control circuit 3004 has the buffer 3002 store the ATM cell 3015 output from the system-1 effective data detector 3001. In this case, if the buffer 3002 has already stored any ATM cells, the selector control circuit 3004 has the buffer 3002 read the earliest ATM cell among the cells stored therein, and has the selector 3003 select it.

(4) If both of the system-0 and system-1 effective data detectors 3000 and 3001 detect no effective ATM cell, the selector control circuit 3004 then checks whether or not the buffer 3002 has stored any ATM cells, and has the buffer 3002 read the earliest ATM cell, if any, among the cells stored therein, and has the selector 3003 select it.

As an alternative of the foregoing item (3), if the system-0 effective data detector 3000 does not detect an effective ATM cell, but the system-1 effective data detector 3001 detects one, and if the buffer 3002 has not stored any ATM cell, the selector control circuit 3004 may have the selector 3003 select the ATM cell 3015 output from the system-1 effective data detector 3001 without storing it in the buffer 3002.

Thus, when both the systems have an effective incoming ATM cell, the selector 3003 selects the ATM cell of the system #0 without delay, and the buffer 3002 stores the ATM cell of the system #1 to delay it until the system #0 has no effective incoming ATM cell, and outputs it to be selected. Here, the order of the ATM cells of the system #1 is assured by the buffer 3002 with its FIFO function.

In the illustrative embodiment, an ATM cell associated with the control information 15a or 15b may arrive at both of the systems simultaneously. In this case, it is not appropriate to discard one of them because they arrive at the same time, but appropriate to output one of them to the next stage with some delay.

The loop-back router 400, FIG. 2A, is supplied from the timing generator 500 with a timing signal 35 indicating whether or not it is the PHOH period of the received data. In the PHOH period of time, the loop-back router 400 selects the test data a–d fed from the test data processor circuits 800, 810, 820 and 830, and sends them to the inside of the same subsystem. On the other hand, outside the PHOH period of time, the loop-back router 400 selects the ATM cells fed from the ACT filters 300, 310, 320 and 330, and sends them to the inside of the same subsystem.

Figure 8:
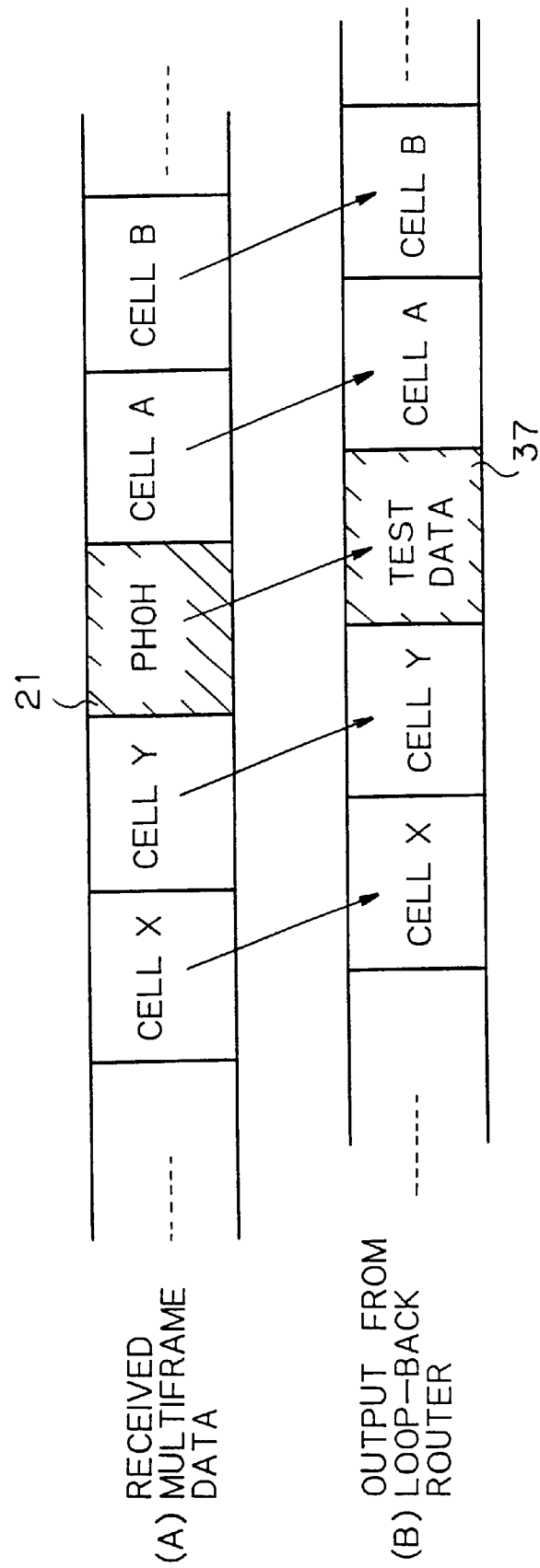
FIG. 8 is a schematic diagram useful for understanding the loop-back test period in the embodiment.

Now, referring to FIG. 8, the PHOH period of the received data delivered to the interface circuit 10A or 10B shown in part (A) of the figure is replaced by the test data 37 output from the loop-back router 400, resultant data being shown in portion (B) of FIG. 8. The phase difference between the sets of data shown in portions (A) and (B) of FIG. 8 corresponds to the processing delay encountered up to the loop-back router 400.

Figure 9:
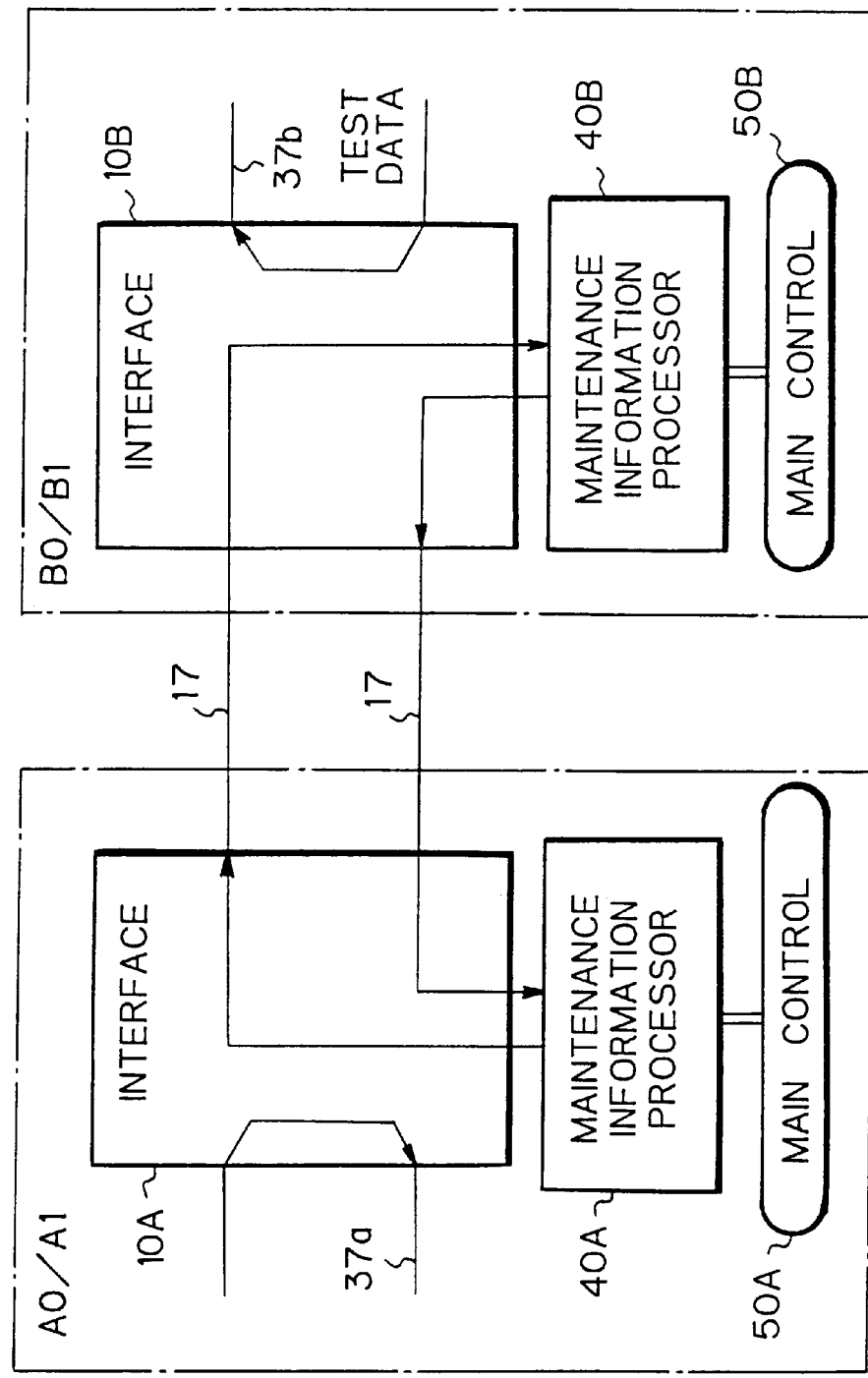
FIG. 9 is a schematic block diagram illustrating how information flows in the PHOH period in the embodiment.

FIG. 9 schematically illustrates the information flow between and in the two subsystems A0 or A1 and B0 or B1 during the PHOH period of time. The illustrated information flow is implemented by disposing the PHOH multiplexers 700, 701, 710, 711, 720, 721, 730 and 731 posterior to the test data processor circuits 800, 810, 820 and 830 and the PHOH separator circuits 200, 201, 210, 211, 220, 221, 230 and 231 previous to the loop-back router 400.

In the PHOH period of time, the maintenance information 17 is transferred between the interface circuits 10A and 10B of the two subsystems A0 or A1 and B0 or B1, and also the test data 37a in the subsystem A0 or A1 are generated by an internal processor 47A interconnected to the control information processor 30A, FIG. 1. The test data 37a are then transmitted to the interface circuit 10A over the transmission line of the control information 15a and user main information 13a, and are looped back at the interface circuit 10A to the internal processor 47A. Likewise, the test data 37b in the subsystem B0 or B1 are generated by the internal processor 47B, and transferred to the interface circuit 10B over the transmission. line of the control information 15b and user main information 13b to be looped back at the interface circuit 10B to the internal processor 47B. The loop-back test may thus be achieved in the subsystems A0 or A1 and B0 or B1 simultaneously and independently of the transfer of the maintenance information 17, as shown in FIG. 9.

The test data processor circuits 800, 810, 820 and 830 and loop-back router 400 may be arranged such that they form loop-back routes for the test data at any time outside the PHOH period in response to an appropriate external control signal, although its control line is not shown in this figure. Such arrangement will be effective for checking in case of a failure.

The timing generator 500, FIG. 2A, is adapted to generate timing signals needed for controlling the various elements of the interface circuit 10 and supplies them to its elements. In the illustrative embodiment, the timing generator 500 can select, by setting a mode, one of two methods for generating the timing signals. The first method is based on an external timing signal 39, and the second is on the phase of the multiframe sync pattern, symbolically depicted by the connection 33, detected by the frame alignment circuits 100, 101, 110, 111, 120, 121, 130 and 131. The latter method is used when the subsystem operates in slave synchronization with the higher-order subsystem corresponding thereto.

Next, the operation of the interface circuit 10 with the foregoing configuration will be described in terms of outside and inside the PHOH period of time.

Outside the PHOH period of time, multiport cell streams output from the cell multiplexer/demultiplexer 20A, which consist of mixed (multiplexed) ATM cells associated with the control information 15a and user main information 13a, arrive at the ACT rewrite circuits 600, 610, 620 and 630 through the test data processor circuits 800, 810, 820 and 830. The ACT rewrite circuits 600, 610, 620 and 630 each update the effective-information bits in their ATM cells into the invalid state thereof only when the ATM cells are user main information ATM cell and their own system is in the standby condition, and othewise maintain the effective-information bits. The resultant outputs will be transmitted to the subsystems interconnected to the system in question through the associated PHOH multiplexers 700, 701, 710, 711, 720, 721, 730 and 731.

On the other hand, having received the data transmitted from the subsystems interconnected to the system in question, the frame alignment circuits 100, 101, 110, 111, 120, 121, 130 and 131 align the phases of the data in accordance with the frame sync pattern, and supply them to the associated ACT filters 300, 310, 320 and 330 through the PHOH separator circuits 200, 201, 210, 211, 220, 221, 230 and 231. The ACT filters 300, 310, 320 and 330 each determine, in response to the effective-information bits in the ATM cells, the validity of a pair of ATM cells fed from the associated pair of PHOH separator circuits 200 and 201, 210 and 211, 220 and 221, and 230 and 231, and supply them to the loop-back router 400, which in turn passes the effective ATM cells without change to supply the sells to the internal components of its own system.

Now, in the PHOH period of time, the test data for the ports in question are input to the interface circuit 10 from the cell multiplexer/demultiplexer 20A. The test data are supplied through the test data processor circuits 800, 810, 820 and 830 to the loop-back router 400, which in turn selects and then returns them to the cell multiplexer/demultiplexer 20A. The returned data representative of the test patterns are compared with their original test patterns by a test pattern generator that generates them. Although not shown in FIG. 1, the test pattern generator may be disposed between the cell multiplexer/demultiplexer 20A and interface circuit 10A, or in the input stage of the interface circuit 10A.

At the same time, in the PHOH period of time, the PHOH multiplexers 700, 701, 710, 711, 720, 721, 730 and 731 each multiplex into the cell streams the PHOHs consisting of the multiframe sync pattern and the maintenance information 17a fed from the maintenance information processor circuit 40A, and transmit them to the subsystem interconnected to the system in question.

On the other hand, the PHOH separator circuits 200, 201, 210, 211, 220, 221, 230 and 231 in the data receiver separates, in the PHOH period, the maintenance information inserted in the data, and in turn supply them to the maintenance information processor circuit 40.

Figure 10:
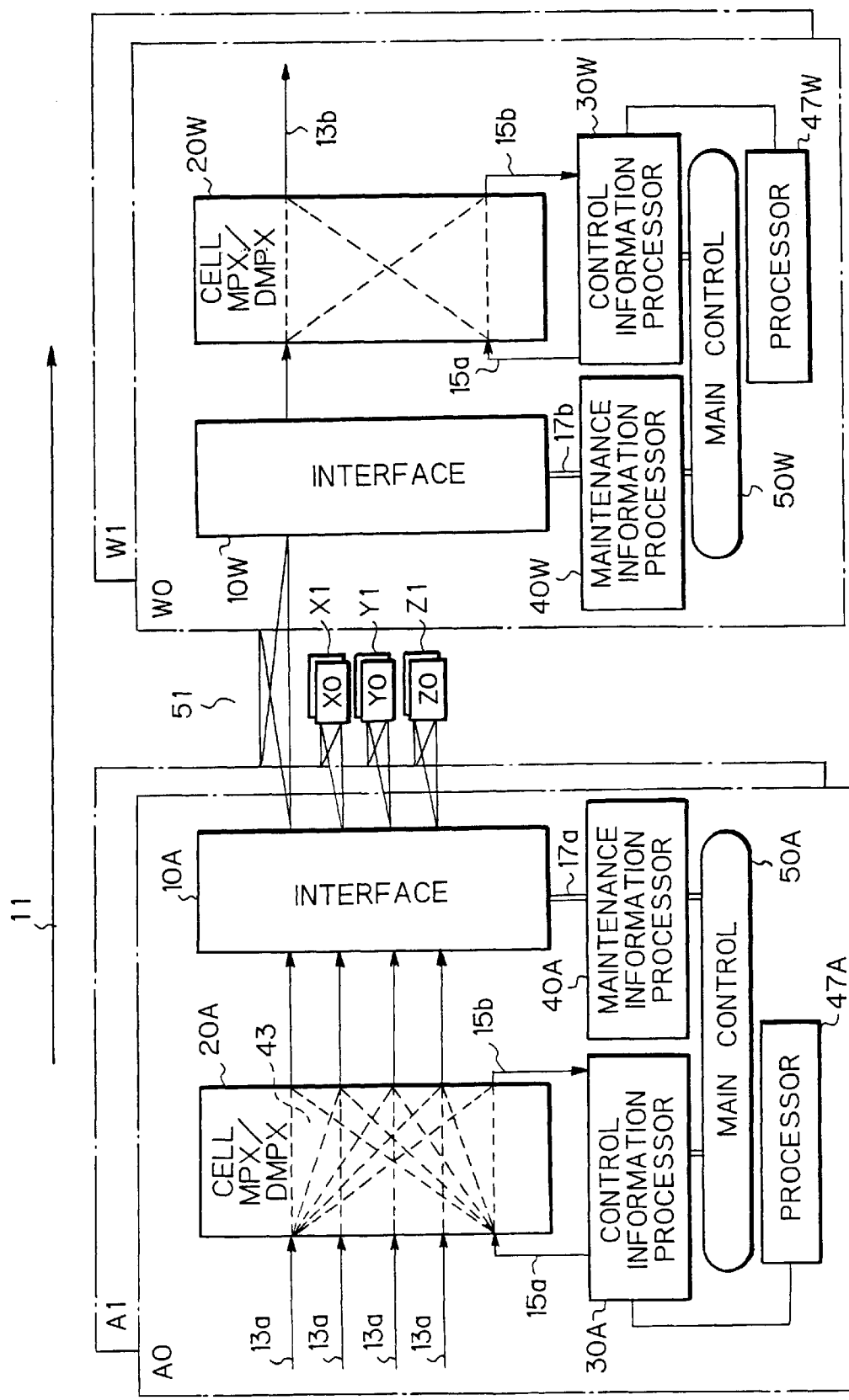
FIG. 10 is a scematic block diagram, similar to FIG. 1, showing interconnections between subsystems of an alternative embodiment of the ATM switch system in accordance with the present invention.

Now referring to FIG. 10 schematically showing the configuration of an alternative embodiment of the ATM switch system in accordance with the present invention, the elements like those shown in FIG. 1 are designated by the same reference numerals, and the redundant description thereof is omitted here. With the specific, alternative embodiment, the subsystems A0 and A1 are the higher-order systems with the interface rate of 622 Mbps, and four subsystems X, Y, Z and W are lower-order systems with the interface rate of 155 Mbps. The pair of subsystems A0 and A1 are cross-connected to four pairs of subsystems X0, Y0, Z0 and W0, and X1, Y1, Z1 and W1 by the interconnections 51 as shown in the figure to form systems #0 and #1 of the redundant structure.

In the embodiment shown in FIG. 10, the subsystems A0 and A1 have the same configuration as the subsystems A0 and A1 shown and described with reference to FIG. 1. The subsystems X0, Y0, Z0 and W0, and X1, Y1, Z1 and W1 are each of the same structure as the subsystem B0 or B1 shown in FIG. 1 except that their interface circuit 10W has a single input port and a single output port, as shown, rather than the four input ports and the four output ports of the interface 10B of the subsystems B0 and B1. The cell multiplexer/demultiplexer 20W has at least 2×2 ports as shown.

Alternatively, the interface circuit 10W of the subsystems X0, Y0, Z0 and W0, and X1, Y1, Z1 and W1 may have the same configuration as the interface circuit 10B of the subsystem B0 or B1 of the FIG. 1 embodiment with only 1×1 port operative among the 4×4 ports rather than the four ports operative of the latter. The cell multiplexer/demultiplexers 20W may also have the same configuration as the multiplexer/demultiplexer 20B of the subsystem B0 or B1 with only 2×2 port operative among the 5×5 ports.

In operation, the PHOH multiplexers 700 and 701, 710 and 711, 720 and 721, and 730 and 731 of the subsystem A0 or A1 (see, FIG. 2B) send to the subsystems X0, Y0, Z0 and W0, and X1, Y1, Z1 and W1 the sequence of data with the format shown in portion (B) of FIG. 5. In this case, the ATM cells to be transmitted have already been divided into the four data sequences to be transmitted to the subsystems X0, Y0, Z0 and W0, and X1, Y1, Z1 and W1 at the stage when they are input to the interface circuit 10, and the maintenance information 17 differs as the destination subsystems differ.

At the receiving side, four pairs of the frame alignment circuits 100 and 101, 110 and 111, 120 and 121, and 130 and 131 each carry out the frame sync (frame alignment) in each pair. More specifically, the frame alignment is carried out by first establishing the frame sync in each of the two systems, and then adjusting the phase of one of the two systems. In this case, the criteria of the establishment and loss of sync are as follows: (1) It is assumed that the sync has not yet been established until the frame sync patterns are found at both of the systems after the power is turned on. (2) It is assumed that the sync has not yet been established during the backward guarding. (3) It is assumed that the sync has been established when the backward guard period of time has elapsed. (4) It is assumed that the sync has been established during the forward guarding. (5) It is assumed that the sync is lost after the forward guard period of time has elapsed.

Since the remaining operation of the alternative embodiment may be identical to that of the embodiment described with reference to FIG. 1, the description thereof is not repeated here.

According to the foregoing embodiments, the following advantages are provided.

(1) The control information, user main information and maintenance information can be transmitted over the same transmission line interconnecting the subsystems because the maintenance information can be transferred in a multiframe to which a plurality of ATM cells can be inserted. This makes it possible to remove the signal lines for the maintenance information from the systems, thereby reducing the number of signal lines to be installed in the ATM switch system in its entirety. In addition, the signal lines for the timing signals can also be omitted because the timing signals are generated in response to the sync pattern in the multiframe structure or generated in each subsystem. The reduction in the number of the signal lines is important because the ATM switch system has a large number of subsystems and an increasing number of subsystems are installed afterward.

(2) The subsystems with different rates can be interconnected as long as they have the ATM interface circuits of the foregoing embodiments even with the different hierarchical transmission rates because the number of the ports of the ATM interface circuits is determined such that it corresponds to the ratio of two interface rates. This makes it possible for a designer of the transmission route to have little consideration of the difference in rates of signals.

Furthermore, enabling the subsystems to use the same interface circuits, each implemented by an IC (Integrated Circuit) chip or package, results in reducing the cost of the interface circuits, and hence the ATM switch system as well. For example, the subsystems X, Y, Z and W shown in FIG. 10 may each employ the interface circuit shown in FIG. 2 with the ports 1, 2 and 3 remaining unused, offering the advantages discussed above.

(3) Even in the redundant system including a duplex configuration, the subsystem in the standby condition can positively achieve the transfer of the information to the subsystem interconnected thereto. Specifically, the maintenance information can be transferred positively because it is inserted in the PHOH period of time. The control information can also be transferred positively because the transmitting side transfers it with maintaining the effective-information bits in its ATM cell, or the receiving end captures the effective ATM cells arriving at the two systems at the same time with shifting their timings using the ACT filters.

(4) Since the subsystems each have the test data processor and the loop-back router carry out the loop-back test in the PHOH period in the multiframe, the state of the subsystems can be checked at every the multiframe period without an adverse effect on the transfer of the control information, user main information and maintenance information between the subsystems.

The present invention is not limited to the illustrative embodiments described above. The following variations can be implemented.

(1) Although it is assumed that the multiframe period is 500 microseconds consisting of 180 cell periods of time when the interface rate is 155 Mbps, and 720 cell periods when the interface rate is 622 Mbps, it is not limited to those periods of time. Besides, the PHOH period of time is not limited to that of the foregoing embodiments consisting of one cell period when the interface rate is 155 Mbps, and four cell periods when the interface rate is 622 Mbps.

(2) Although the foregoing embodiments are adapted to handle a duplex ATM switch system as a redundant system, the present invention is also applicable to a non-redundant system or to a triplex or more redundant system. Besides, the invention is also applicable to a system with different single or two-fold system configuration.

(3) Although the illustrative embodiments described above are adapted to handle the system with the interface rates of 155 Mbps and 622 Mbps, the present invention can be applied to a system with another pair of interface rates, or to a system with three or more interface rates. In such cases, the number of ports is set at the least common multiple of ratios between the minimum rate and the other plurality of rates.

(4) Although the ACT filters of the foregoing embodiments are adapted to buffer the ATM cells of the active system, they may be adapted to buffer the ATM cells of the standby system at that time.

(5) Although the present invention is applied to the ATM switch systems in the foregoing embodiments, it is also applicable to other ATM transmission systems configured by interconnecting a plurality of subsystems.

(6) Although the present invention is applied to the ATM cell transmission between two subsystems constituting a single total system, it is also applicable to the ATM cell transmission between two independent systems. The term "ATM transmission system" in the specification refers to the subsystems described with reference to the specific, illustrative embodiments, and the independent systems as well.

(7) Although the loop-back test is carried out at every PHOH period of time in the foregoing embodiments, it can be performed at longer intervals, such as at every several PHOH periods of time.

The entire disclosure of Japanese patent application No. 67754/1997 filed on Mar. 21, 1997 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. An ATM (Asynchronous Transfer Mode) transmission system for transferring and receiving an ATM cell to and from another ATM transmission system interconnected thereto, comprising:
  a multiplexer for multiplexing ATM cells to be sent to the interconnected ATM transmission system;
  a maintenance information processor for generating maintenance information to be sent to the interconnected ATM transmission system, and for processing maintenance information sent from the interconnected ATM transmission system; and
  an interface circuit for establishing interface with the interconnected ATM transmission system,
  said interface circuit comprising:
    a data transmitter for assembling and transmitting a multiframe including an information field and an overhead portion having a multiframe sync pattern, the multiframe being assembled by inserting into the information field the ATM cells multiplexed by said multiplexer, and by inserting into the overhead portion the maintenance information fed from said maintenance information processor,
    a data receiver for deassembling received data including the multiframe sent from the interconnected ATM transmission system into the ATM cells and the maintenance information, and for providing said maintenance information processor with the maintenance information, and
    a demultiplexer for demultiplexing the ATM cells output from said data receiver into individual ATM cells,
    wherein said data transmitter and said data receiver each comprise parallel processors whose number equals a least common multiple of one or more ratios between a minimum interface rate and one or more other interface rates of the one or more interconnected ATM transmission systems;
    said ATM transmission system comprising an ATM cell transfer and acquisition circuit for providing, at the minimum interface rate, each of said parallel processors of said data transmitter with an ATM cell to be transmitted, and for acquiring, from each of said parallel processors of said data receiver, a received ATM cell sent at the minimum interface rate.

2. The ATM transmission system in accordance with claim 1, further comprising a timing generator for generating timing signals used in said ATM transmission system in response to the multiframe sync pattern in the received data.

3. An ATM transmission system, comprising:
  an interface circuit including a data transmitter for transmitting an ATM cell to one or more other ATM transmission systems interconnected thereto;
  a data receiver for receiving an ATM cell sent from any of the one or more other interconnected ATM transmission systems,
    wherein said data transmitter and said data receiver each comprising parallel processors whose number equals a least common multiple of one or more ratios between a minimum interface rate and one or more other interface rates of said one or more interconnected ATM transmission systems; and
    an ATM cell transfer and acquisition circuit that provides, at the minimum interface rate, each of said parallel processors of said data transmitter with an ATM cell to be transmitted, and that acquire, from each of said parallel processors of said data receiver, a received ATM cell sent at the minimum interface rate.

4. An ATM transmission system for use as one of an active system and a standby system forming a redundant system for transferring an ATM cell to a plurality of other ATM transmission systems interconnected thereto and forming a corresponding redundant system, comprising:
  an effective-information bit handling circuit for setting an effective-information bit in an ATM cell to be transmitted to one of effective and ineffective states in response to a type of the ATM cell and to whether said ATM transmission system is an active or standby system; and
  a received ATM cell passage control circuit for discarding an ATM cell from each of an active system and a standby system of said corresponding redundant system when the effective-information bit of the ATM cell indicates the ineffective state, and for outputting incoming ATM cells from the active system and standby system with their output timings shifted when the effective-information bits of the incoming ATM cells indicate the effective state.

5. The ATM transmission system in accordance with claim 4, wherein said received ATM cell passage control circuit passes, when system fixing information is externally provided to said ATM transmission system, only an effective ATM cell sent from the ATM transmission system of the corresponding redundant system, which corresponds to the ATM transmission system indicated by the system fixing information.

6. An ATM transmission system, comprising:
  an interface circuit including a data transmitter that transmits an ATM cell to one or more other ATM transmission systems interconnected thereto;
  a data receiver that receives an ATM cell sent from said one or more other ATM transmission systems,
    wherein said data transmitter and said data receiver each comprise parallel processors in a quantity that equals a least common multiple of a plurality of ratios between a minimum interface rate and a plurality of other interface rates of said one or more other ATM transmission systems; and
    an ATM cell transfer and acquisition circuit that provides, at the minimum interface rate, each of said parallel processors of said data transmitter with an ATM cell to be transmitted, and that acquires from each of said parallel processors of said data receiver, a received ATM cell sent at the minimum interface rate.

7. The ATM transmission system in accordance with claim 6, wherein the one or more other ATM transmission systems include a plurality of other ATM transmission systems, and wherein said ATM transmission system and said plurality of other ATM transmission systems are mutually independent of each other.

8. The ATM transmission system according to claim 6, further comprising a transmission line interconnecting the ATM transmission system with the one or more other ATM transmission systems, wherein the ATM transmission system and the one or more other ATM transmission systems are subsystems of a total ATM system comprising at least four ATM transmission subsystems interconnected by said transmission line.

9. The ATM transmission system in accordance with claim 3, wherein the one or more other ATM transmission systems include a plurality of other ATM transmission systems, and wherein said ATM transmission system and said plurality of other ATM transmission systems are mutually independent of each other.

10. The ATM transmission system according to claim 3, further comprising a transmission line interconnecting the ATM transmission system with the one or more other ATM transmission systems wherein the ATM transmission system and the one or more other ATM transmission systems are subsystems of a total ATM system comprising at least four ATM transmission subsystems interconnected by said transmission line.

* * * * *